April 4, 1939.   H. JOHANSEN   2,152,740
SHOCK ABSORBER
Filed Jan. 28, 1938   2 Sheets-Sheet 1
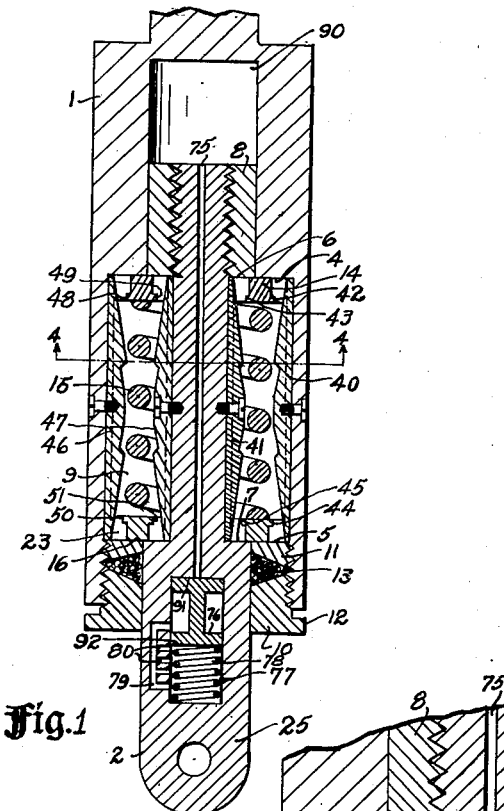
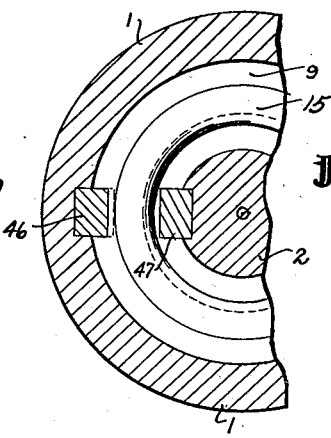
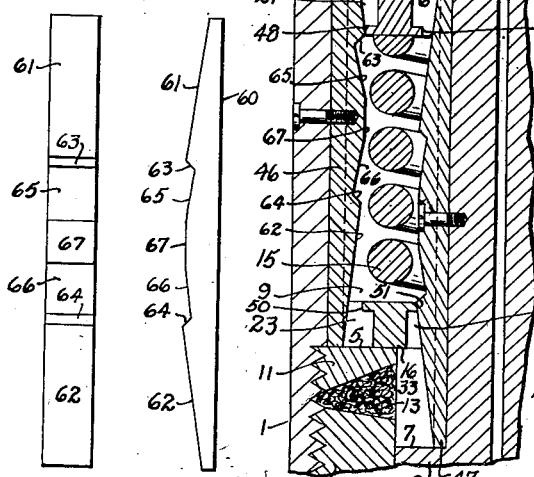
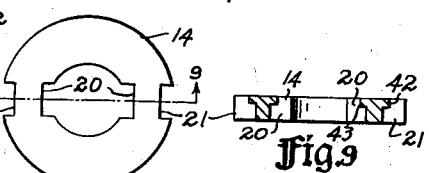
INVENTOR.
HANS JOHANSEN
BY
his ATTORNEY.

April 4, 1939.  H. JOHANSEN  2,152,740

SHOCK ABSORBER

Filed Jan. 28, 1938  2 Sheets-Sheet 2

INVENTOR.
HANS JOHANSEN
BY
*Johnt Leonard*,
his ATTORNEY.

UNITED STATES PATENT OFFICE 2,152,740

SHOCK ABSORBER

Hans Johansen, Mantua, Ohio

Application January 28, 1938, Serial No. 187,422

11 Claims. (Cl. 267—8)

This invention relates to a shock absorber for vehicles and the like which is suitable for use in connection with automobiles where the body is resiliently mounted on a support and forces of impact or shock are transferred to the body from the support, resulting in objectionable oscillations of the body on the support. This shock absorber is equally useful in connection with the drawing of heavy transitory equipment, such as railway cars, where heavy shocks are imposed on the coupler connecting the heavy equipment to their source of locomotion, and also where shocks are imposed during the actual transitory movement of the equipment, which shocks, so imposed on the coupling member, are substantially transferred therefrom to the body and cause considerable damage to the body and also a great loss of power. The use of this shock absorber is practical and effective for damping gun fire shocks produced in the use of artillery equipment, and it is recognized that many other uses may be made for effectively damping heavy shocks.

It is a principal object of this invention to provide a two-way, double-cycle, shock absorbing means which is effective for damping shocks in either of two directions, as when the absorber is used in connection with a coupling member of a heavy transitory body or in connection with a resiliently supported vehicle body. In my Patent No. 2,023,527, issued December 10, 1935, there is described a coupling member which is basically a shock absorber and is effective in damping such shocks as heretofore described, and the present invention is directed to an improvement thereof, especially in securing an increased damping effect of the shocks for the purpose of substantially preventing these shocks from being transferred to the vehicle body or frame.

It is an important object of this invention to provide a two-way shock absorbing means for damping shocks accompanying the application of a force to a body by gradually making application of the force to the body until a complete application is made, and upon decrease in magnitude of the force applied to the body, or upon a force being exerted in the opposite direction to that of the first applied force, making a gradual application to the body of the variation of magnitude or reversal in direction for damping the shock.

It is an equally important object of this invention to provide a two-way shock absorbing means for a coupling member for use on a heavy transitory body which has a member movable relative to the body and resisted in movement by fluid, which shock absorbing means causes a force applied to the movable member to be gradually transferred to the heavy body, and upon substantially transferring the forces to the body, continuing such transfer through the fluid resistance during the continuance of the application of force to the member, whereby the force is applied to the body without substantial impact or shock.

It is a more specific object of this invention to provide a two-way shock absorbing means for a coupling member for use on a heavy transitory body which has a member movable relative to the body, which means is operative for resisting by fluid pressure the movement of the member upon application of a force to the member and includes means for producing a maximum relief to the fluid resistance caused by the initial movement of the movable member and for gradually decreasing the relief during continued movement until a maximum resistance is produced, whereby the shock of force applied to the movable member is damped and the subsequent continued applied force is entirely transferred gradually through the fluid resistance to the body until all the applied force is effective on the body.

It is a further object of this invention to provide for use on a heavy transitory body having a coupling member movable relative to the body and resisted by fluid, a means for relieving the fluid resistance produced upon the initial movement of the member by a force applied to the member, and for gradually reducing the relief to the resistance during continued movement of the member in the same direction until a maximum resistance is produced, whereupon the force acting on the movable member is transferred to the body through the fluid resistance produced, and said means damping shocks imposed upon the movable member during the application and continuance of application of the force through the fluid resistance to the body.

It is a correlative object of this invention to provide a two-way shock absorbing means for a resiliently supported body having a member movable relative to the body and resisted in movement by fluid, means for relieving fluid resistance upon initial movement of the member from a normal position and for gradually decreasing such relief during continued movement of the member in the same direction until a maximum resistance is produced and continuing such resistance during continued movement of the member in the same direction and gradually increasing the relief during the return of the member to its normal position.

Other and more important objects of this invention will become apparent from the drawings and the specification, but it is to be understood that the same principles of operation which are adaptable for use as a shock absorber in connection with a coupling member of a heavy body where it is desirable that the shocks or impacts accompanying the application of force to the body are appreciably damped are adaptable also in effecting the damping of the shocks received by the axle of a self-propelled vehicle.

In the drawings, Fig. 1 is a sectional view illustrating an embodiment of my invention;

Fig. 2 is a partial sectional view illustrating the same embodiment in one operative position;

Fig. 3 is a partial sectional view illustrating the same embodiment in another operative position;

Fig. 4 is a transverse sectional view along the line 4—4 of Fig. 1;

Figs. 5, 6 and 7 are plan, side and end views, respectively, of the valve plate illustrated in Fig. 1;

Fig. 8 is a plan view, and Fig. 9 is a sectional view along the line 9—9 of Fig. 8, of a plunger element illustrated in Fig. 1;

Figure 10:
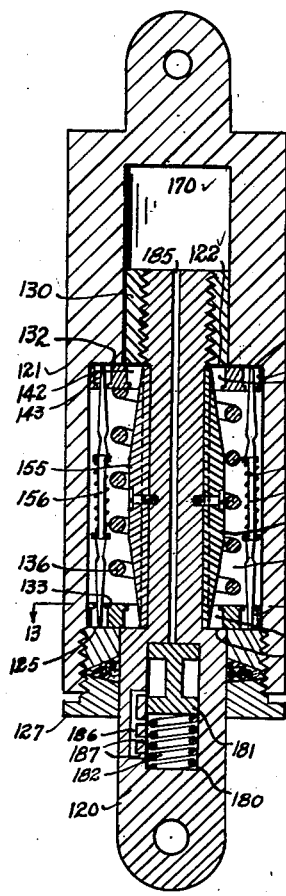
Fig. 10 is an illustration of another embodiment of my invention.

In the general assembly of a shock absorber, especially of the piston type, the outer housing or cylinder is connected to the frame or body, and the relatively movable member or piston is arranged for connection to the coupler, in the case of a drawn vehicle, or to the axle, in the case of a self-propelled vehicle.

In Fig. 1, the housing or outer cylinder 1 is arranged for connection to the frame of a vehicle (not shown), and the piston 2 is arranged for connection to a coupler or axle (not shown).

A working fluid chamber 9 is defined by an inner surface of the cylinder 1, an outer surface of the piston 2, and a pair of oppositely disposed shoulders 6 and 7 on the piston 2 and shoulders 4 and 5 on the cylinder 1. For the purpose of assembly, the shoulder 6 on the piston is formed by means of a sleeve 8 threaded to the piston 2 and the shoulder portion 5 of the outer cylinder is formed by an inner gland plate 11 threaded to the cylinder 1. The working chamber 9 is thus formed between the surfaces of the cylinder 1 and piston 2 and limited and defined in its length by the shoulders 4 and 5 of the cylinder 1 and shoulders 6 and 7 of the piston 2. The piston 2 is supported by the sleeve 8 acting against an inside surface of the cylinder 1 and also by a gland member 10 which is composed of the inner plate 11 and a pressure member 12 which is likewise threaded to the cylinder 1 and exerts a pressure against the gland material 13 for forming a pressure-tight joint between the surfaces of the gland 10 and the supported surface of the piston 2.

A plunger 14, as illustrated in Figs. 8 and 9, is normally positioned in the working chamber 9 against the shoulders 4 and 6 of the cylinder 1 and piston 2, respectively, by a spring 15. A like plunger 16 is positioned against the shoulders 5 and 7 of the cylinder 1 and piston 2, respectively, by the same spring 15. Fluid is entrained between the operating faces of the plungers 14 and 16 which are so arranged that movement of the piston 2 in one direction, for example, relatively downwardly in Fig. 3, causes the shoulder 6 to move the plunger 14 into the working chamber 9 while the plunger 16 is held in position by the shoulder 5 of the cylinder 1, and movement of the piston 2 in the opposite direction, for example, relatively upwardly in Fig. 2, causes the shoulder 7 to move the plunger 16 into the compression chamber 9 while the plunger 14 is held in position by the shoulder 4 of the cylinder 1.

For the purpose of relieving the pressure or fluid resistance developed in the working chamber 9 by the relative movement of the plunger elements 14 and 16 toward each other, relief is given to resistance in a manner so that an effective damping action can be secured for the purpose of preventing the objectionable shocks or impacts received by the piston 2 being transferred to the cylinder 1 and thence to the frame or body of the vehicle to which the cylinder is connected. Fig. 1 illustrates a means embodying the invention and which provides this manner of relief of fluid resistance produced when the piston 2 is moved from the indicated normal position of Fig. 1. In this embodiment, referring to Figs. 1 to 9, inclusive, relief is secured by the openings 20 and 21 of the plunger 14, and like openings 22 and 23 of the plunger 16. In other words, because of the presence of these openings in the plungers 14 and 16, the pressure or fluid resistance is relieved upon the initial movement of the piston 2 in either of the two directions, whereupon, if a moving force be applied to the connectible end 25 of the piston 2, very little, if any, resistance would be produced by the action of the plunger elements 14 and 16 as they are moved inwardly into the compression chamber 9. This is illustrated in Figs. 2 and 3, where it is evident that, the piston 2 moving in the direction indicated in Fig. 2 from a position indicated in Fig. 1, the fluid resistance would be relieved through the openings 20 of plunger 14 into the formed relief chamber 30, and through the openings 23 of plunger 16 into the formed relief chamber 31, while, if the piston 2 is moved in the opposite direction, as indicated in Fig. 3, from the normal position indicated in Fig. 1, the fluid resistance would be relieved through the openings 21 of plunger 14 into the formed relief chamber 32, and through the openings 22 of plunger 16 into the formed relief chamber 33, as illustrated in Fig. 3.

For the purpose of securing a balanced relief action on the piston 2, a pair of openings 20 and 21 are placed in the plunger 14, Figs. 8 and 9, and a pair of openings 22 and 23 are placed in the plunger 16 in a similar manner. However, a single opening 20 may be placed diametrically opposite a single opening 21, and likewise a single opening 22 may be placed diametrically opposite a single opening 23 for providing an operative structure.

In the embodiment of my invention illustrated in Fig. 1, a valve plate 46 may be affixed to the surface of the cylinder 1 by a slot and screw arrangement, as illustrated in Figs. 1 and 4, and a valve plate 47 to a surface of the piston 2 by a similar arrangement for cooperating with the valve surfaces 48 and 49 on the plunger 14, and valve surfaces 50 and 51 on the plunger 16. Likewise, valve plates 40 and 41 are affixed to the surfaces of the cylinder 1 and piston 2, respectively, and cooperate with valve surfaces 42 and 43 of the plunger 14, and valve surfaces 44 and 45 of the plunger 16, respectively. Figs. 5, 6 and 7 show in detail a construction of valve plate illustrated in Fig. 1. These valve plates consist principally of a base surface 60 having valve surfaces consisting of diverging surfaces 61 and 62 which are terminated by cut-offs 63 and 64, and continuing with a pair of diverging surfaces 65 and 66 which terminate in a flat surface 67. The presence of these cut-offs 63 and 64 is not necessary on the valve plate since the embodiment will operate effectively if diverging surfaces 61 and 62 are terminated by the flat surface 67.

It is to be observed that although in Fig. 1 there are illustrated two sets of valve plates 40 and 41 and 46 and 47, the absorber may be made with one set of valve plates, as plates 46 and 47, controlling the relief of the fluid resistance to the formed relief chambers, such as 30 and 31 in Fig. 2, and 32 and 33 in Fig. 3. Also, the plates need not be positioned as illustrated in Figs. 2 and 3 in that plate 46 may be positioned anywhere on the surface of the cylinder 1 and plate 47 anywhere on the surface of the piston 2. As an example, valve plate 40 may be used in conjunction with valve plate 47, and also valve plate 46 may be used in conjunction with valve plate 41. It is necessary that some valve means be provided for controlling the relief from the working chamber 9 to the formed relief chambers 30 and 31, Fig. 2, and also the control of the relief from the working chamber 9 to the formed relief chambers 32 and 33, Fig. 3.

In the operation of the embodiment illustrated in Fig. 1, upon the application of a pulling force to the piston 2 in a direction such that the piston is moved outwardly, as illustrated in Fig. 3, the shoulder 6 on the piston 2 causes a movement of the plunger 14 into the working chamber 9 against the action of the spring 15 and against the resistance of the fluid in the working chamber 9. At the same time, the plunger 16 is held against the shoulder 5 of the cylinder 1 by the action of the fluid pressure produced by the movement of the plunger 14 and also by the action of the spring 15. By the movement of the plunger 14, a relief chamber 32 is produced, and upon movement of the piston 2, as illustrated in Fig. 3, a relief chamber 33 is produced. At the instant of relative movement of the piston 2, the resultant openings 21 are limited by the valve plates 46 and 40 and the resultant openings 22 of plunger 16 as limited by the valve plates 47 and 41 of the plunger 14 substantially completely relieve the fluid resistance produced at the instant of initial movement. Upon further movement in the same direction, the action of the diverging surface 61 of the valve plates 40 and 46 acting in cooperation with valve surfaces 42 and 48 of the plunger 14 cause a reduction in the amount of the opening 21 in a manner such that upon continued movement of the plunger 14 in the same direction as the initial movement, the relief of the fluid resistance to the relief chamber 32 is gradually reduced until the plunger element 14 reaches the position illustrated in Fig. 3. Continued movement of the plunger 14 in the same direction causes an instantaneous substantial relief of the pressure because of the cut-off 63 of valve plates 40 and 46, but upon continued movement the relief is gradually decreased, due to the diverging surface 65 of valve plate 40 and 46 which terminates in a flat surface 67 of each of the valve plates, at which time the maximum fluid resistance is produced. During movement of the plunger 14 as above described, the plunger 16 is held in position by shoulder 5 of cylinder 1, but the movement of the piston 2 and valve plates 47 and 41, cooperating with the valve surfaces 51 and 45 of plunger 16 similarly reduces the relief of the fluid resistance by the passing of fluid from the working chamber 9 to the formed relief chamber 33. The effect of this action of gradual decrease in the relief to the resistance produces a damping action to shocks which are received by the piston 2, and because of this damping action, the shocks are eliminated or substantially decreased and not transferred to the cylinder 1 and thence to the body of the vehicle.

Upon return of the piston 2 to its normal position, a gradual increase in relief is produced until a maximum relief is provided, at which time the piston will be at or near its normal position. Continued movement of the piston 2 in the same direction produces conditions as set forth in connection with the description of Fig. 2.

A force or shock being applied to the piston 2 in a direction opposite to that described in connection with Fig. 3 causes a relative movement of the piston 2, as illustrated in Fig. 2. Upon such relative movement, the relief chambers 30 and 31 are formed consequent upon the movement of the piston 2. Due to the diverging surfaces 61 of valve plates 41 and 47 and surfaces 62 of valve plates 40 and 46, the fluid resistance produced by the initial movement of the plunger element 16 is substantially completely relieved through the resultant openings formed by the openings 20 of the plunger 14 and the valve plates 41 and 47 of the piston 2 to the formed relief chamber 30, and the resultant openings in the plunger 16 formed by the openings 23 and the valve plates 40 and 46 of the cylinder 1 to the formed relief chamber 31. This relief is gradually decreased during continued movement in the same direction of the piston 2 by the cooperative action of valve surfaces 43 and 49 of the plunger 14 with surfaces on the valve plates 41 and 47, respectively, controlling the fluid relief to the chamber 30, and likewise valve surfaces 44 and 50 of plunger 16 cooperating with surfaces on the valve plates 40 and 46, respectively, in controlling the fluid relief to the chamber 31 until the plunger elements reach the position illustrated in Fig. 2. At this time, because of the cut-offs 63 on the surfaces of the valve plates, a substantial instantaneous relief is produced upon further movement of the piston in the same direction. This action is followed by a gradual decrease of the relief of the resistance upon continued movement in the same direction as illustrated in Fig. 2 until a maximum resistance is produced, at which time the valve surfaces of the plunger elements 14 and 16 will contact the flat surface 67 of the valve plates.

During such action of relief of the resistance, the shock received by the piston 2, causing relative movement of the piston, is substantially damped, and the shock is not transferred to the cylinder 1, and thence to the frame or body of the vehicle.

Upon the return of the piston 2 to its normal position, as illustrated in Fig. 1, from its extreme displaced positions in the directions of movement as illustrated in Figs. 2 and 3, a further damping action is produced in the gradual increase of relief of fluid resistance produced in the relief chambers, which resistance opposes the movement of the piston 2 back to its normal position. This gradual increase in relief is secured by the cooperative action of the valve surfaces on the plungers with the valve surfaces on the valve plates, so that the relief to the fluid resistance is very small at the instant of movement of the piston 2 back to its normal position. As the piston 2 continues its movement in the same direction toward its normal position, the relief is gradually increased until a substantially complete relief is produced, at which time the piston is at or near its normal position, as illustrated in Fig. 1.

In the use of this embodiment of my invention as a shock absorbing means for a coupling member on a relatively heavy transitory body, a force being applied to the coupler is transferred to the body in a manner so that the effect of the impact or shock accompanying such application of a force to the body is substantially decreased or eliminated. Continued application of the force in the same direction as would ordinarily occur in moving the body from one location to another is made to the body through the fluid resistance set up by the displacement of the members, as illustrated in Figs. 2 and 3. Should leakage dissipate the fluid resistance created, the complete load or force supplied to the coupler is then transferred to the body through the spring 15.

Upon the application of a force in a direction opposite to the force which has caused the displacement of the members resulting in a maximum resistance, this force in the opposite direction would be applied to the body in a manner such that the shock or impact accompanying the application of such reversal in direction of force is substantially or entirely eliminated. If the force is continued in this same reverse or opposite direction, it is gradually applied to the body upon the movement of the piston 2, from the normal position, as illustrated in Fig. 1, to a maximum distorted position, as heretofore described in connection with Figs. 2 and 3, whereupon the force is applied to the frame or body through the created fluid resistance or through the spring.

Additional shocking means may be provided by the employment of a cylinder 77, Fig. 1, which is formed within the piston 2 and having a movable piston 76 working within the cylinder 77 and resisted in movement by a spring 78 and connectible by a passage 75 formed by an inner surface of cylinder 1 and an end surface of piston 2. Upon the movement of the piston 2 into the chamber 90, fluid pressure is produced by the fluid entrained therein, causing the fluid to pass through the passageway 75 to a surface 92 of the piston 76, thereby causing the piston 76 to move into the cylinder 77 and against the spring 78. For resisting the movement of the piston 76, fluid is placed in the cylinder 77 which resists the action of the fluid acting against the surface 92 of the piston 76 from the passage 75. In order that the fluid pressure produced on the side 91 of the piston may be relieved, a by-pass 79 is provided having small passageways 80 all being formed in the piston 2. These small passageways 80 may be connected to the cylinder 77 at distances as illustrated, this location of passageways 80 depending upon the extent of relief necessary for the proper operation of the cushioning or dampening of the piston 2 as it moves into the chamber 90. This additional shocking means is useful especially when used in connection with a coupling member of a heavy body.

Many modifications incorporating my invention may be made over that illustrated in Fig. 1 which would produce similar or like results in the effective damping action. One such modification is illustrated in Fig. 10. In this embodiment there has been substituted for the stationary valve plates 40 and 46 needle or spindle valves 151 and 156, respectively. This type of valve is shown in detail in Fig. 16, and consists of a body 115 having a pair of diverging surfaces 104 and 105 which are interrupted by a cut-off 106 and 107, followed by a continued pair of diverging surfaces 108 and 109. The spindle valve is made up of a pair of these valve bodies 115 connected together by being threaded to the same shaft 111. A separable valve element 200 is placed adjacent each of the valve bodies 115 and it is held against the valve body by a spring 159, as in Figs. 10, 11 and 12.

Figure 12:
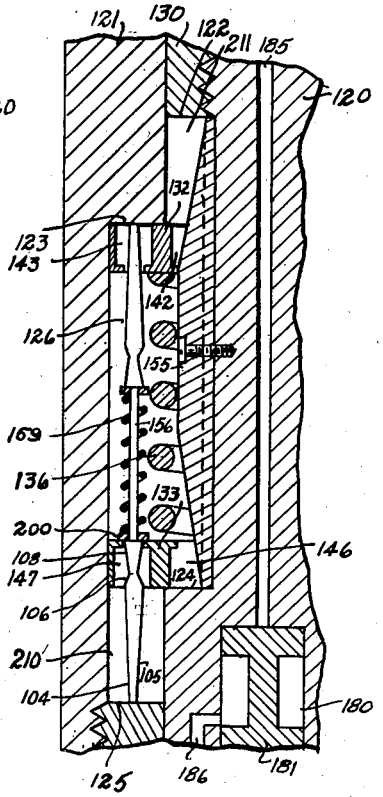
Figure 13:
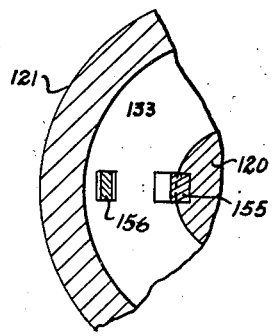
Fig. 13 is a fragmentary transverse section taken along the line 13—13 of Fig. 10.

In the embodiment illustrated in Fig. 10, many of the principal parts of the absorber are similar to those illustrated in Fig. 1, and a description of these parts will not be given in detail because of such similarity. The piston 120 fits into the hollow cylinder 121, and the cooperating shoulder elements 122 and 124, and 123 and 125 of the piston 120 and the cylinder 121, respectively, and surfaces of the piston and cylinder form a working chamber 126. The shoulder 122 is formed by a sleeve 130 threaded to an end of the piston 120, and the shoulder 125 of the cylinder is formed by a gland 127 threaded to the cylinder 121. The plunger elements 132 and 133 are positioned against the shoulder elements of the piston and cylinder by a spring 136. Openings are formed in the plunger elements for the purpose of relieving the fluid resistance produced during movement of the plunger elements into the working chamber 126. Such openings are shown at 140, 141, 142 and 143 of the plunger element 132, and at 144, 145, 146 and 147 of plunger elements 133, Figs. 10, 11 and 12. Cooperating with openings 141 and 145 is a stationary valve plate 150, and cooperating with openings 140 and 144 is a spindle valve 151. Likewise, cooperating with openings 142 and 146 is a stationary valve plate 155, and cooperating with the openings 143 and 147 is a spindle valve 156. Fig. 13 illustrates this cooperation of the spindle valve 156 and the stationary plate 155 with the plungers 132 and 133.

There is also illustrated the cushioning device formed by the compression of fluid in the chamber 170 upon movement of the piston 120. The cushioning is further accelerated by a cylinder 180 in the piston having a piston 181 and resisted in movement by fluid and by a spring 182, the cylinder 180 being connected to the chamber 170 by a passage 185. The by-pass 186 is formed in the piston 120 having passages 187 for relieving the fluid pressure exerted upon the movement of the piston 181 into the cylinder 180. As the piston 120 is moved into the chamber 170, fluid pressure in the chamber 170 opposes this movement, which is gradually relieved by the movement of the piston 181 relative to the cylinder 180. As the piston 181 moves relative to the cylinder 180, the pressure resisting its movement is relieved by the fluid passing through the passageways 186 into the by-pass 182 and thence to a non-pressure side of the piston. This additional cushioning means is very effective in the use of my shock absorbing means with a coupler since shocks of great intensity are applied to the coupler in a direction causing movement as illustrated in Fig. 12.

Figure 11:
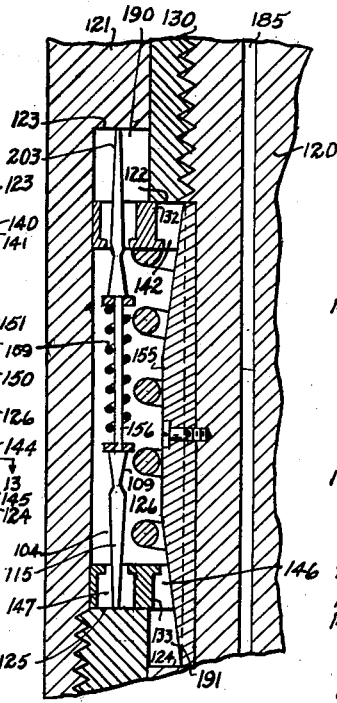
Figs. 11 and 12 are fragmentary longitudinal sectional views, each illustrating an operative position of this embodiment.

In the operation of the embodiment illustrated in Fig. 10, upon a shock being received by the piston 120, resulting in relative movement of the piston with respect to the cylinder 121, as illustrated in Fig. 11, this movement causes relative movement of the plunger element 132 into the working chamber 126, which movement is resisted by fluid and by the spring 136. The fluid resistance is relieved by the openings connecting the working chamber 126 with the formed relief chambers, hereinafter described. The openings in the plunger element resulting from the cooperation of the valve members and the plunger elements are of sufficient size to substantially completely relieve the fluid resistance produced consequent upon initial movement of the plunger elements 132 and 133 into the working chamber 126.

Figure 16:
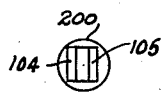
Figs. 14, 15 and 16 are side, plan and end views, respectively, of a spindle valve illustrated in the embodiment of Fig. 10.
Figures 14, 15:
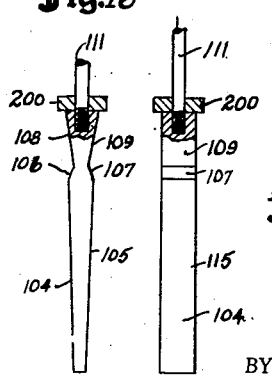

By the relative movement of the piston 120 from the normal position as illustrated in Fig. 10, and assuming a shock or impact is received by the piston member 120, causing its movement as illustrated in Fig. 11, the relief of the resistance is substantially completely relieved through openings 140 and 143 in plunger 132 to the formed relief chamber 190, and openings 145 and 146 in plunger 133 to relief chamber 191, and the relief is gradually reduced through the openings 140 and 143 to the relief chamber 190 by the action of the valve surfaces of the plunger 132 cooperating with the valve surfaces 104 and 105, Figs. 14, 15 and 16, of the spindle valves 151 and 156, and the relief through the openings 145 and 146 to the relief chamber 191 is gradually reduced by the action of valve surfaces on the plunger 133 and on the valve plates 150 and 155, until the plunger reaches the position illustrated in Fig. 11.

Upon further movement in the same direction of the plunger 132 into the working chamber 126, an instantaneous relief is produced by the cut-offs 106 and 107 of spindle valves 151 and 156, followed by a gradual decrease in the relief by the action of the valve surfaces of the plunger 132 cooperating with the diverging surfaces 108 and 109 of the spindle valves 151 and 156 and valve surfaces of plunger 133 and cooperating surfaces of valve plates 150 and 155 until a maximum resistance is produced, at which time the plunger 132 engages the valve elements 200 of spindle valves 151 and 156, closing openings 140 and 143, and the openings 145 and 146 have been closed by surfaces of the valve plates 150 and 155, which completely cuts off any further relief except that which is produced by leakage. Upon further movement of the plunger 132 in the same direction as illustrated in Fig. 11, the action is resisted by the spring 159 which normally positions the valve elements 200 against surfaces of the pair of valve bodies 115. By this manner of decrease of relief of the resistance, the shock received by the piston 120 resulting in its relative movement is appreciably damped, thereby preventing its transfer to the cylinder 121. A further damping action is secured upon the return of the piston 120 to its normal position in a direction of movement as illustrated in Fig. 12, in that the relief of the fluid resistance produced is gradually increased until a full relief is secured. If the movement of the piston 120 continues beyond its normal position, as illustrated in Fig. 10, in a direction as illustrated in Fig. 12, the fluid resistance produced consequent upon this further movement will be gradually decreased in relief in a like manner, that is, the fluid resistance produced by the movement of the plunger element 133 into the working chamber 126 is relieved through the openings of the plunger elements 132 and 133, respectively, as illustrated in Fig. 12.

By the action of the cooperating valve surfaces of the spindle valves 151 and 156 with the valve surfaces of the plunger element 133, the relief of the resistance to the formed relief chamber 210 is gradually reduced, and likewise the relief of the resistance to the formed relief chamber 211 is gradually reduced by the action of the valve surfaces of the plunger element 132 cooperating with the stationary valve plate 150 and 155. This gradual decrease in relief continues until the plunger element 132 reaches the cut-offs 106 and 107 of the spindle valves 151 and 156, resulting in a substantially instantaneous decrease in relief of the fluid resistance, followed by a gradual decrease in relief upon further movement of the plunger element 133 into the working chamber 126 until a position is reached as illustrated in Fig. 12, at which time, upon further movement of the plunger element 133, any relief to the fluid resistance would be secured by means of leakage. At this time, the plunger element 132 has reached the position illustrated in Fig. 12, whereupon the relief of fluid resistance to the relief chamber 211 is substantially cut off except as secured by means of leakage. The piston 120 starts from its normal position as illustrated in Fig. 10 and moves in the direction indicated in Fig. 12, whereupon a damping action is produced similar to that produced when the piston moves in the direction illustrated in Fig. 11.

An advantage of the use of a positive action type of valve as the spindle valve 156 is in the use of my shock absorbing means in connection with a coupling member for heavy bodies; that is, when the piston 120 has moved to a position as indicated in Fig. 12, the force acting on the piston is then completely transferred to the body through the fluid resistance and the cylinder 121. By a positive type of valve, leakage is eliminated and the fluid resistance can be maintained for transferring force therethrough. Such type of valve can be substituted for the valve plates 150 and 155. Should the fluid resistance be relieved by leakage, then the force is transferred to the body through the spring 136.

Modifications may be made of the valve arrangement over that illustrated in Fig. 10, as in the use of a single stationary valve plate 155 and a single valve spindle 156 for producing an effective damping action of shock received by the piston 120. The advantage in the use of the arrangement illustrated in Fig. 10 is that it produces a balanced damping action upon movement of the piston 120. It is possible to position the spindle valve 156, as illustrated in Fig. 10, and then to use a stationary valve plate 150, Fig. 10, which is diametrically opposite in location from the valve spindle 156. This arrangement provides an effective damping action and also a more balanced condition than an arrangement of placing the spindle valve and the valve plate side by side, but the effectiveness in damping is less than that of the modification illustrated in Fig. 10. In the use of either of the embodiments illustrated in Fig. 1 or Fig. 10, the effectiveness of the cushioning chambers 90 and 170 of Figs. 1 and 10, respectively, is greatly increased when used in connection with a coupling member for a drawn body; that is, the tremendous shocks imposed upon the coupling member and directly transferred to the shock absorbing means are effectively dampened by the gradual decrease of the relief of the cushion produced upon the movement of the piston 120 into the chamber 170 of Fig. 10, and likewise the movement of the piston 2 into the chamber 90 of Fig. 1.

Generally, my invention provides a shock absorbing means having a movable member relative to a body and which is resisted in movement in either of two directions in such a manner that upon initial movement of the member from a normal position caused by the application of a force in one of the two directions, the fluid resistance is substantially relieved, and upon continued movement in the same one of the directions, the relief is gradually decreased until a maximum resistance is produced, at which time the force then acting on the member and in the same one direction is transferred to the body by the resistance, or if the force consists of a substantially instantaneous shock desired to be completely damped, the manner of relief of resistance substantially damps and prevents the shock from being transferred to the body. Return of the movable member from a distorted position to its normal position produces a damping effect by the gradual increase in the relief of the resistance until the member reaches its normal position. Upon continued movement of the member in the same direction beyond the normal position by reason of a continued application of the force in the same direction, such force is applied in a gradual manner to the body because of the gradual decrease in the relief of the fluid resistance until a maximum resistance is produced, at which time the force acting in the opposite direction is completely transferred to the body.

It is to be understood that although the invention has been described in some instances in connection with the continued application of forces to a body, as would occur in the use of the shock absorbing means in connection with a coupling member, the invention is not to be limited thereby since it has wide application, as in the case of a resiliently mounted body where it is desired to prevent or substantially decrease any transfer of force from the support to the body, and the force so applied to the support is not of a continuing nature but is generally of an instantaneous nature, as in the case where the support strikes an obstruction, causing movement of the support relative to the body, and it is desired to prevent this transfer to the body of movement or shock.

Having thus described my invention, I claim:

1. In a two-way shock absorber means including a hollow cylindrical member having a relatively movable member telescopically mounted therein and a fluid chamber formed by surfaces of the members, end limits of the fluid chamber being defined by cooperating shoulder portions on each of the members, displacement means disposed at each end of the chamber and held in a normal position against the shoulder portions by a yieldable means for forming a working chamber, fluid in said working chamber for resisting movement of said relatively movable member, and comprising openings in said displacement means for relieving fluid resistance produced by movement of said movable member in either of the two directions of movement, and valve means in said openings operable by the movement of the relatively movable member in either of the two directions for gradually reducing the relief in the resistance produced consequent upon movement of the relatively movable member in either of the two directions from its normal position until a maximum resistance is produced, and for gradually relieving the maximum resistance produced during the return of the movable member to its normal position.

2. In a two-way shock absorber means including a hollow cylindrical member having a relatively movable cylindrical member telescopically mounted therein and a fluid chamber formed by surfaces of the members, end limits of the fluid chamber being defined by cooperating shoulder portions on each of the relatively movable members, displacement means disposed at each end of the chamber and held in a normal position against the shoulder portions by a yieldable means for forming a working chamber, fluid in said working chamber for resisting movement of said relatively movable member, and comprising openings in said displacement means for relieving fluid resistance produced by movement of said movable member in either of the two directions of movement, and valve means in said openings operable by the movement in either of the two directions of the relatively movable member, said valve means gradually decreasing the relief of the fluid resistance until a predetermined resistance is produced upon movement from a normal position of said movable member in either of the two directions, instantly substantially relieving the fluid resistance upon further movement of the member in the same direction and gradually decreasing the relief during continued movement in the same direction until a maximum fluid resistance is produced.

3. In a two-way shock absorber including a hollow cylindrical member having internally spaced oppositely disposed shoulder portions, a relatively movable member telescopically mounted within the hollow member and having oppositely disposed shoulder portions which cooperate with and are similarly spaced as the shoulder portions of the hollow cylindrical member, the shoulder portions of the hollow member and the relatively movable member defining the end limits of the chamber formed by surfaces of the telescoping member and comprising displacement means at each end of the chamber for defining a working chamber and for forming relief chambers consequent upon the movement of the movable member from its normal position, yieldable means in the working chamber and abutting the displacement means for positioning normally the displacement means against the shoulder portions of the hollow cylindrical member and the relatively movable member, fluid in said chamber for resisting movement of said movable member, openings in each of the displacement means for fluidly connecting the working chamber with the relief chambers formed consequent upon movement of the relatively movable member and for relieving fluid resistance developed during movement of the movable member in either of two directions, and valve means in said openings operable by movement of said relatively movable member for substantially completely relieving fluid resistance produced by initial movement in either of two directions from a normal position and for gradually decreasing the relief of said resistance during continued movement of the member in the same direction until a maximum resistance is produced and then gradually increasing the relief of the resistance upon return of the member back to its normal position.

4. A two-way shock absorbing means for a coupler of a heavy transitory body comprising a hollow cylindrical member, a piston member extending thereinto, one of these members being a force receiving member connected to the body, a chamber defined by surfaces of each of the members, cooperating shoulders on each of said members for defining the end limits of the chamber, displacement means in said chamber, a yieldable means for normally positioning the displacement means at each of the end limits of the chamber, fluid in said chamber for resisting movement of said piston member, openings in said displacement means for relieving fluid resistance produced upon relative movement of said piston member by the application of a force in either one of two directions, and valve means controlling the relief through the openings for completely relieving fluid resistance produced upon initial movement of said piston member by a force applied to one of the members and for gradually applying to the force receiving member the force causing relative movement of the movable member by the gradual increase of fluid resistance to the movement of the movable member until a maximum resistance is produced, at which time the force acting on the one member is completely transferred to the force receiving member by the fluid resistance.

5. A two-way shock absorbing means for a coupler of a heavy transitory body comprising a hollow cylindrical member connected to the body, a piston member connected to the coupler, a chamber defined by surfaces of each of the members, cooperating shoulders on each of said members for defining the end limits of the chamber, displacement means in said chamber, a yieldable means for normally positioning the displacement means at the end limits of the chamber, fluid in said chamber for resisting movement of said piston member, openings in said displacement means for relieving fluid resistance produced upon movement of said piston member by the application of a force in either one of two directions, valve means controlling the relief through the openings for completely relieving fluid resistance produced upon initial movement of said piston member by a force applied to the piston member and for gradually applying to the hollow member the force causing movement of the movable member by the gradual increase of fluid resistance to the movement of the movable member until a maximum resistance is produced, at which time the force acting on the piston member is completely transferred to the hollow member by the fluid resistance, and a further shock absorbing means comprising a chamber defined by a surface of said hollow member and a compression surface on said piston member, fluid in said chamber for resisting movement of said piston member by acting against said compression surface, and relief means for said fluid resistance for gradually reducing the relief during movement of said piston from a normal position to its position of maximum displacement.

6. A two-way shock absorber including a hollow cylindrical member and a relatively movable cylindrical member mounted therein and having a surface in spaced relation to a surface of the hollow member for defining a fluid chamber therebetween and comprising a displacement means in said fluid chamber movable in the same general direction into said fluid chamber upon relative movement of said movable members in each of said directions for resisting by fluid movement of said movable member in either of two directions of movement, by-pass means adapted and arranged to relieve fluid resistance to movement of the movable member, and valve means cooperating with the displacement means and moved into variable restricting relation to said by-pass means by relative movement of said movable member from a normal position to a maximum displaced position and the return thereof for controlling the relief of resistance through the by-pass means during movement of said member.

7. A two-way shock absorber including a hollow cylindrical member, a relatively movable member within said hollow member, longitudinally spaced supporting sections secured to said hollow member, coacting longitudinally spaced supporting sections secured to said movable member so that mounting of said movable member within the hollow member defines a fluid chamber formed by surfaces and the coacting supporting sections of each of the members, and comprising displacement means at each end of the fluid chamber and movable toward and away from the supporting sections of the hollow member for resisting by fluid movement of said movable member in either of two directions of movement, yieldable means for normally positioning each of the displacement means against a coacting supporting section of each of the movable members, by-pass means for relieving the resistance to movement of said movable member, and valve means moved into variably restricting relation to said by-pass means by movement of said movable member relative to said hollow member from a normal position to a maximum displaced position and the return thereof for controlling the relief of resistance through the by-pass means during movement of said movable member.

8. A two-way shock absorber including a hollow cylindrical member, a relatively movable member within said hollow member, longitudinally spaced supporting sections secured to said hollow member, coacting longitudinally spaced supporting sections secured to said movable member so that mounting of said movable member within the hollow member defines a fluid chamber formed by surfaces and the coacting supporting sections of each of the members, and comprising displacement means normally positioned at each end of the fluid chamber against a supporting section of the movable member, each of the displacement means being moved by a supporting section of one of the members relative to the other member upon movement of the movable member for resisting by fluid movement of said member in either of two directions of movement, by-pass means associated with each of the displacement means for relieving resistance to movement of the movable member, and valve means moved into variable restricting relation to said by-pass means by movement of said movable member from a normal position to a maximum displaced position and the return thereof for controlling the relief of resistance through the by-pass means during movement of said member.

9. A two-way shock absorber comprising a hollow cylinder and a piston member extending thereinto in spaced relation to the effective cylinder wall for actual movement relative to the cylinder, fixed shoulders on the cylinder transverse to the axis and at opposite effective ends of the cylinder, annular displacement members in the fluid space between the cylinder and piston, each of the members being movable toward and from the fixed shoulders, yielding means acting on the displacement members in a manner tending to hold them against the shoulders, axially opposed shoulders on the piston member alternately engageable with the displacement members upon predetermined relative movement in opposite directions of the piston and cylinder to move them alternately away from the first mentioned shoulders, and the displacement members and radially adjacent surfaces of the cylinder and piston being related in such manner that upon relative movement of the piston and cylinder in either of two directions of movement a by-pass of gradually reducing area is formed between one displacement member and the cylinder due to movement of such displacement member by one piston shoulder and simultaneously a by-pass of gradually reducing area is formed between the other displacement member and the radially adjacent surface of the piston.

10. A two-way shock absorber comprising a hollow cylinder and a piston member extending thereinto in spaced relation to the effective cylinder wall for axial movement relative to the cylinder, fixed shoulders on the cylinder transverse to the axis and opposite to the effective ends of the cylinder, annular displacement members in the fluid space between the cylinder and piston, each of the displacement members being movable toward and from fixed shoulders, yielding means acting on the displacement members in a manner to hold them against the shoulders, axially opposed shoulders on the piston member alternately engageable with the displacement members upon relative movement in opposite directions between the piston and cylinder to move them alternately away from the first mentioned shoulders, a valve member secured to the effective wall of the cylinder and having a variable surface in operative relation with each of the displacement members for alternately forming a by-pass of gradually reducing area by movement of one of the displacement members, and a valve member secured to the piston member and having a variable surface in operative relation with each of the displacement members for alternately forming a by-pass of gradually reducing area by movement of one of the displacement members.

11. A two-way shock absorber including a hollow cylindrical member and a relatively movable cylindrical member mounted therein and having a surface in spaced relation to a surface of the hollow member for defining a fluid chamber therebetween and comprising a displacement means in said fluid chamber for resisting by fluid movement of said movable member in either of two directions of movement, by-pass means adapted and arranged to relieve fluid resistance to movement of the movable member, valve means moved into variable restricting relation to said by-pass means by movement of said movable member from a normal position to a maximum displaced position and the return thereof for controlling the relief of resistance through the by-pass means during movement of said member, and a secondary shock absorber means comprising a fluid chamber defined by surfaces of said hollow member, said relatively movable member extending thereinto, fluid in said chamber for resisting movement of said relatively movable member, means for relieving resistance to movement, and means controlling said relief means for gradually reducing the relief of resistance to movement during movement of said relatively movable member from a normal position to a maximum displaced position.

HANS JOHANSEN.